Figure 1:
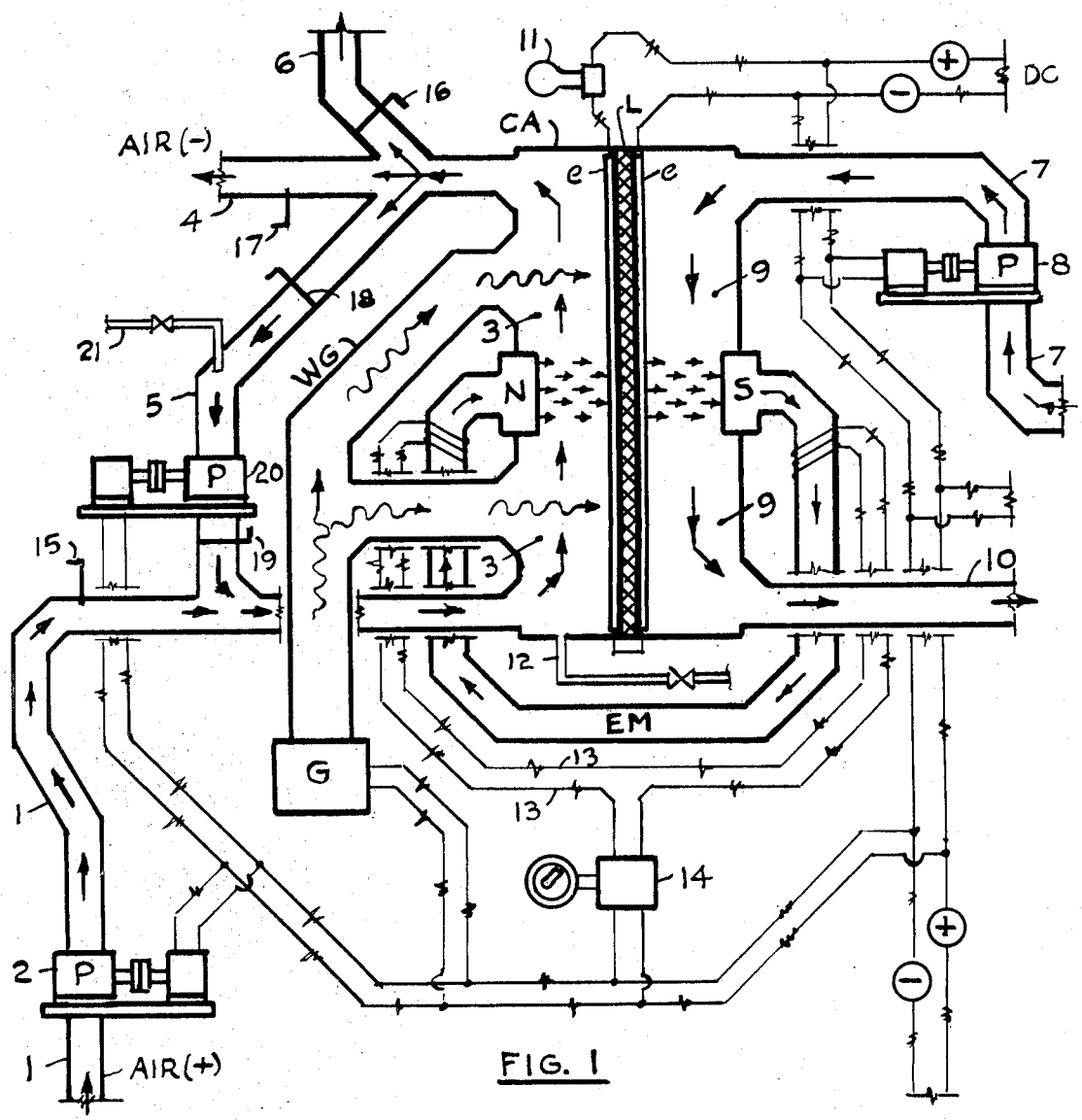

United States Patent [19]
Johnsen

[11] 3,847,670
[45] Nov. 12, 1974

[54] FUEL CELLS USING ELECTROMAGNETIC WAVES

[76] Inventor: Carsten Ingeman Johnsen, 26 Le Brun, Arendal, Norway

[22] Filed: Feb. 28, 1968

[21] Appl. No.: 708,994

[52] U.S. Cl. ............................ 136/86 R, 204/157.1
[51] Int. Cl. ......................................... H01m 27/02
[58] Field of Search ............ 204/157.1, 155; 136/86

[56] References Cited
UNITED STATES PATENTS

| | | | |
|---|---|---|---|
| 3,477,878 | 11/1969 | Hughes et al. | 136/86 |
| 1,844,420 | 2/1932 | Buttolph | 204/157.1 X |
| 2,089,966 | 8/1937 | Kassner | 204/157.1 |
| 2,664,394 | 12/1953 | Reeves | 204/155 |
| 3,186,929 | 6/1965 | Rippie | 204/155 |
| 3,228,868 | 1/1966 | Ruskin | 204/155 X |
| 3,306,835 | 2/1967 | Magnus | 204/157.1 |

FOREIGN PATENTS OR APPLICATIONS

| | | | |
|---|---|---|---|
| 226,788 | 2/1960 | Australia | 204/157 |
| 973,217 | 9/1950 | France | 136/86 |
| 528 | 0/1873 | Great Britain | 204/155 |

Primary Examiner—A. B. Curtis

[57] ABSTRACT

This invention relates to methods and means for invigorating electrochemical activities in producing fuel cells by causing advancing electromagnetic to impinge on migrating ionized oxidants flowing through one fuel cell passage whereby additional masses of ions are transported through electrolytic barrier while radiant energy accompanying said waves are also absorbed by entities in the other fuel cell passage; said transported ions reacting with entities of reactants while radiant energy absorption effects infusion and surcharging of energy content of entities to higher, excited energy levels by diversion of much of the energy liberated by exothermic reactions of said ions with reactants; said surcharging effecting emission of electrons to electrodes additionally enhancing electrical output of fuel cells. Oxygen-lean air will be produced as described when oxidant used is air. Recovery of liberated electrons from associated magnetic fields may also be effected.

2 Claims, 1 Drawing Figure

Carsten Ingeman Johnsen

FUEL CELLS USING ELECTROMAGNETIC WAVES

The principles involved in fuel cells may be considered as follows: When two substances capable of reacting chemically are caused to flow through separate passages of operative fuel cells, said passages being separated by an electrolytic barrier permitting ions of one of said substances to migrate from one of said passages, through said barrier, joining entities of the other substance flowing through the other fuel cell passage, then an exothermic reaction carried out electrochemically will result, generating electrical energy and hot reaction products. If electrodes are provided at barrier boundaries for acceptance and discharge of the electrical charges involved, and connected to an external circuit and electric load, then electrons will flow in said circuit, continuing untill chemical equilibrium is established.

Conventional fuel cells generally operate at low thermal and economic efficiencies compared to their theoretical capabilities notwithstanding the relatively intense energies liberated. In a hydrogen—air fuel cell, for example, the reaction may be written:

$$2H_2 + O_2 = 2H_2O + 243,240 \text{ B.T.U.}$$

when 4 lbs. hydrogen combines with 32 lbs. oxygen from air. Similarly, in a carbon monoxide—air fuel cell, the reaction will be:

$$CO + \tfrac{1}{2}O_2 = CO_2 + 122,320 \text{ B.T.U.}$$

and in a natural gas—air fuel cell; natural gas being methane.

$$CH_4 + 2O_2 = 2H_2O + CO_2 + 383,280 \text{ B.T.U.}$$

One reason for the relatively poor performance of most fuel cells heretofore developed, is the sluggishness of their normal electromotive forces, failing unaided to effect the transport of ions in adequate masses to engage and react with all the entities of the other reactive substance made available in the other fuel cell passage.

Another reason is non-utilization of much of the quantitatively substantial high level energies liberated in said exothermic reactions, unconverted residual energy being degraded to heat and discharged with reaction products.

The useful employment of electromagnetic waves and accompanying radiation is one of the valuable characteristics of my present invention. It is an accepted fact that said oscillations exert pressure on any surface they strike, having momentum and consequently mass.

Therefore, by subjecting a reactive substance flowing through one of the passages of a producing fuel cell to continuous impingement of momentum of advance of the excessively minute material entities of properly oriented advancing electromagnetic waves, an increase in migration velocities and masses of ionized oxidants of said reactive substance transported through the fuel cell electrolytic barrier, will be effected, aided also by mutual attraction of ions and radiant energy.

A broadening and intensification of the exothermic reactions in the other fuel cell passage between said delivered ionized oxidants and the other reactive substance will be one of the results, while said waves, continuing their advance, are absorbed together with their accompanying radiation, a situation developing thereby with substantial benefits to operation and electrical output of fuel cells.

It will be noted here that the atoms and molecules of substances contributing to said exothermic reaction pass through successively upgraded energy levels from their basic, ground state $E_1$. After processing in the presence of heat from raw material, their energy level has risen to $E_2$ on entry into said other passage. As a result of break-up and remaking of chemical bonds in the exothermic reaction, energy release causes a rise to level $E_3$.

When said absorbed waves and radiation are of adequate intensity and suitable frequency $E_3 - E_2/h$, h being Planck's constant, then a larger number of atoms and molecules will be surcharged to a state, usually called "excited," over and above numbers of ambient and related atoms and molecules remaining at lower energy levels due to continuous entry of said processed reactive substances.

Said surcharging is effected by infusion via said absorbed radiation not only of its own relatively modest multiples of quantum, but in addition much of the quantitatively preponderant energy liberated by the said exothermic reaction.

Said continuously maintained numerical relationship between groups of ambient and related atoms and molecules at differing energy states, give rise to continuous emission of energy to retain active equilibrium. Since activities described take place in elements of a producing fuel cell wherein reactions are carried out electrochemically, said emitted energy will be discharged to, and accepted by, respective electrodes, external circuit and coupled load as hereinbefore described, enhancing electrical output of fuel cells.

The method described may be considered analogous to injection of feed water from a water source into a steam boiler by the action of live steam. In such an analogy the net energy made available by the exothermic reaction is the equivalent of the "water source," the advancing waves and their accompanying radiation absorbed, is "the live steam;" while the fuel cell electrodes, external circuit and electric load is "the receiving steam boiler."

I submit that utilization of electromagnetic waves and accompanying radiant energy to infuse and convert energy liberated by exothermic reactions in producing fuel cells described herein, is new to the art and may properly be called an Energy Infusion Method.

It is not intended to restrict my invention to the use of specific wave lengths and frequencies. However wave guides limit wave lengths to micro and infra-red regions of the electromagnetic spectrum and are assumed to be in excess of oscillations produced by Nature or by others.

Electrical output of fuel cells may be additionally stimulated by recovery for use, electrons flowing in atoms and molecules of magnetized substances, which comprises effecting an intimate association of reactive substances flowing in passages of producing fuel cells on the one hand, and a properly oriented magnetic field activated by a magnet in which the opposed poles are disposed in close proximity to opposite sides of said fuel cell on the other hand; said magnetic field magnetizing said substances as well as aiding transport of ionized oxidants of one of said reactive substances through the fuel cell electrolytic barrier.

To prevent accumulation of magnetized atoms and molecules to one of said magnet's poles, the polarities will be reversed at short intervals of time liberating said electrons. The environal effect of intimate association of said liberated electrons with encompassing exothermic reactions carried out electrochemically, stimulates emergence of emissive conditions for said electrons, effecting their discharge to respective electrodes, electron conductors of the external circuit and coupled load, enhancing the electrical energy output of said fuel cell.

An additional valuable feature of the present invention concerns the extraction of oxygen atoms from air when used as one of the reactive substances in a fuel cell. By recirculating the same air quantity a plurality of times through the fuel cell air passage and a bypass connecting air intake and exit, the oxygen content of the air will decrease progressively as a result of extraction via migration of oxygen ions under the influence of electromotive forces, oxygen-lean air becoming available thereby.

My invention is illustrated in broad outlines by the accompanying drawing. In said drawing:

FIG. 1 illustrates a fuel cell "CA" equipped with means for the stimulation of electrochemical activity herein illustrated, described and claimed. It will be noted that it is not my intention to limit the present invention to the use of any specific combinations of reactive substances but for the purpose of illustration only, let it be assumed that said fuel cell operates on carbon monoxide and air.

Air, preferably preheated as well as ionized by methods old to the art is supplied to "CA" via duct 1 and pump 2, then caused to flow through passage 3 subjected to activity herein described, said air minus oxygen atoms extracted is thereupon discharged via ducts 4, 5 or 6 to disposal, recirculation for production of oxygen-lean air, or to reconversion as outlined hereinafter under FIG. 2 via duct 6.

Simultaneously carbon monoxide, preferably at an elevated temperature which may be reached, if desired, as a result of processing from raw materials and reuse of discharges is supplied via duct 7 and pump 8 for reactions in passage 9 with ionized oxidants to carbon dioxide and unreacted carbon monoxide for discharge to atmosphere or reconversion.

As outlined hereinbefore oxygen ions are caused to migrate, impelled by electromotive forces, from passage 3, through barrier "L" and electrodes "e," their atoms encountering and reacting with carbon monoxide molecules in passage 9 in exothermic reactions carried out electrochemically, electrical charges on said ions liberated and accepted by respective electrodes "e" and electrical load represented by 11 via electron conductors of "DC."

To overcome fuel cell reaction deficiencies from concentration polarization caused by failure of residue of said ion to diffuse back to electrode, $CO_2$ may be supplied via pipe 12.

Electrochemical activity in a producing fuel cell "CA" will be invigorated and electrical output enhanced by causing substances flowing through passage 3 to be exposed to continously advancing waves produced by generator "G" and conveyed to 3 via waveguides "WG" as illustrated; impingement on substances flowing through said passage effecting an increase of velocity of migration as well as transported masses of ions through barrier and electrodes, engaging and reacting with additional entities of carbon monoxide, intensifying and broadening exothermic reactions in passage 9, augmenting also electrical charges to respective alectrodes and external circuit "DC."

Having absorbed said advancing waves and multiples of radiation quantum, an infusion of liberated energy from the exothermic reaction is thereby effected as hereinbefore outlined; surcharging atoms and molecules in passage 9 to an emissive condition discharging in an electrochemically reactive environment additional electrical charges to respective electrodes, electron condutors "EC" and load; again enhancing electrical energy output of said fuel cells.

Installing an electromagnet "EM" activated by conductors 13 in addition to said advancing waves, aids electrical output of fuel cells; properly oriented flux impinging on migrating ions while magnetizing said reactive substances. A current direction changing device 14 reverses magnet polarities, separated by small time intervals between recurrences, preventing accumulations at magnet poles while liberating electrons flowing in atoms and molecules of magnetized substances. Presence of said activity in electrochemical environment yields electrons to electrodes and circuit "DC."

Oxygen-lean air may be made by closing valves 15, 16 and 17, then opening valves 18 and 19 starting pump 20 recirculating a given quantity of entrapped air in ducts 3 and 5, a plurality of times. Oxygen atoms are thereby extracted in a producing fuel cell with zero as its theoretical limit; oxygen-lean air via duct 6, maintaining internal pressure by adding nitrogen via 21.

By the use of my invention in its entirety or utilizing one or more of its novel features herein described, illustrated and claimed, substantial economies in the expenditure of materials and energy will result. New high thermal and economic efficiencies will be reached, changing a hoped for, distant possibility on this subject, to an immanent probability, apparent to those familiar with the pertinent arts.

Having described and illustrated my invention relating to stimulation of electrical output from producing fuel cells, I claim:

1. in the process for generating electricity which comprises passing an ionized oxidant through the first passage of a producing fuel cell while a fuel is passed through its second passage separated from the first passage by an electrolytic barrier installed between electrodes connected to an external circuit and electrical load; the method enhancing electricity output of fuel cells which includes a first step effecting an intimate association of oxidant ions migrating through the electrolytic barrier on the one hand and advancing waves of electromagnetic origin possessing momentum, appropriate frequencies as well as accompanied with radiation, on the other hand; and a second step orienting the fuel passages and the advancing waves relatively to each other such that the migrating ions and the advancing waves move in the same direction, the advancing waves impinging on the migrating ions thereby augmenting the velocities of said ions and transporting added masses of ions per unit of time through the electrolytic barrier to the fuel cell fuel passage engaging and reacting therein with available fuel entities intensifying and broadening exothermic reactions carried out electrochemically; followed by a third step whereby electrons from electrical charges liberated via said reactions from the additionally transported ions are absorbed by and yielded from respective fuel cell electrodes, external circuit and coupled load in a manner identical with similar absorption and yielding of electrons taking place simultaneously as results of normal activities in conventional producing fuel cells; the said several steps effecting substantial enhancement of electrical output of fuel cells.

2. the method as claimed in claim 1 having in addition the step of producing oxygen-lean air which comprises recirculating the same air quantity when said ionized oxidant is ionized air, a plurality of times through the first passage of the producing fuel cell; reducing oxygen content in said recirculated air quantity via extraction of oxygen ions by normal producing fuel cell activities; making available oxygen-lean air for useful employment.

* * * * *